United States Patent Office 3,531,667
Patented Sept. 29, 1970

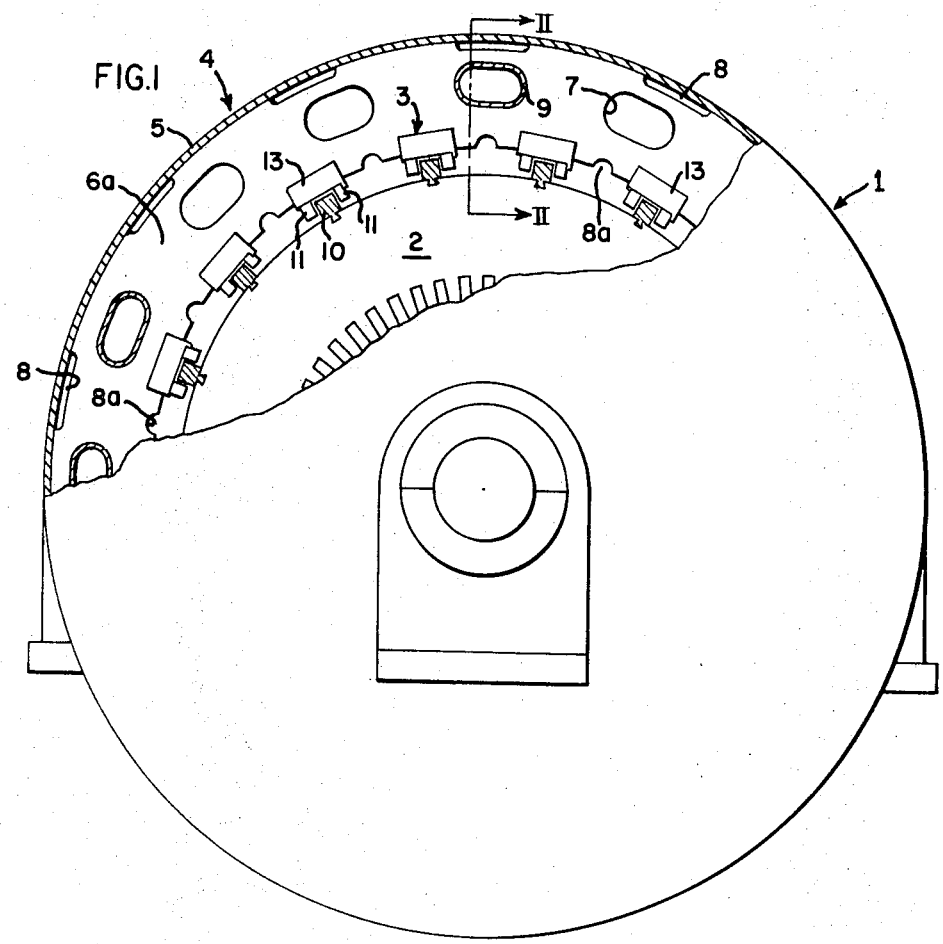
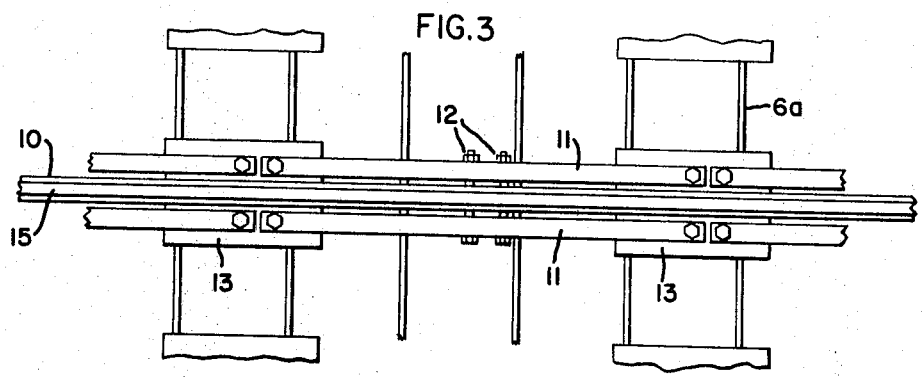

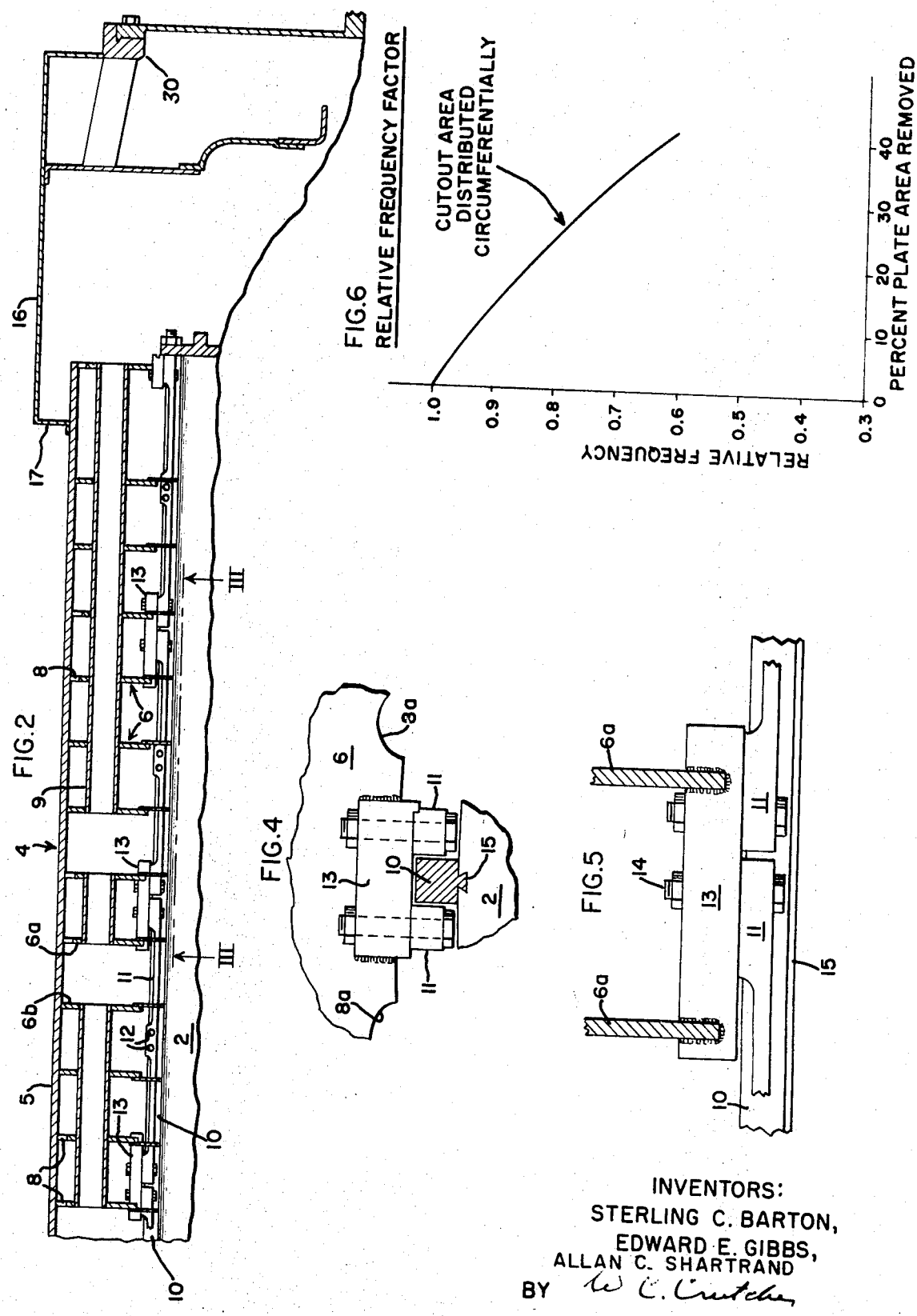

3,531,667
LOW FREQUENCY STATOR FRAMES FOR DYNAMOELECTRIC MACHINES
Sterling C. Barton, Scotia, Edward E. Gibbs, Schenectady, and Allan C. Shartrand, Scotia, N.Y.; said Barton and said Gibbs assignors to General Electric Company, a corporation of New York
Filed May 12, 1969, Ser. No. 823,638
Int. Cl. H02k 5/24
U.S. Cl. 310—51      8 Claims

ABSTRACT OF THE DISCLOSURE

In a large electric generator with a cylindrical frame supporting the electromagnetic core on horizontal spring bars, the frame is caused to have a fundamental natural frequency below the 120 hertz core vibration forcing frequency by tuning individual sections of the frame to a common low frequency. This is accomplished by selectively employing individual mounting pads for the spring bars, cutouts in the section plates, flexible end shield supports, and otherwise varying the mass and stiffness of the individual sections.

BACKGROUND OF THE INVENTION

Figure 7:
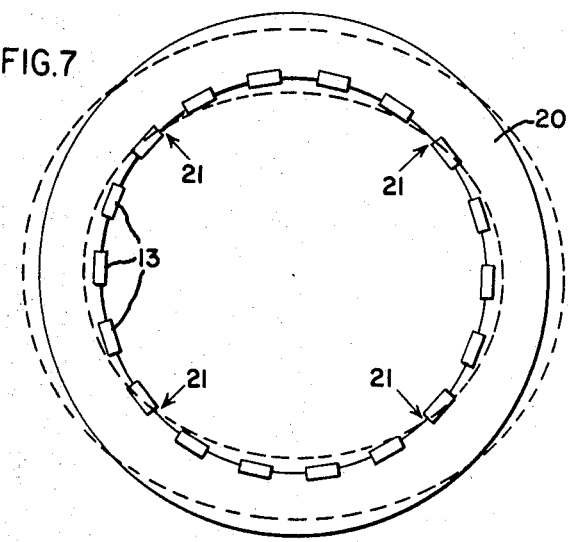

This invention relates generally to cylindrical stator frames supporting the wound electromagnetic stator cores of large dynamoelectric machines, such as steam turbine-generators. More particularly, it relates to constructions allowing the use of larger magnetic cores without proportionately increasing the outer diameter of the generator frames or requiring more complicated cage-type constructions.

The stator cores of some dynamoelectric machines, particularly two-pole generators, are subject to vibratory forces caused by the magnetic field of the rotor. This tends to distort the core into an elliptical shape. It is well known to those skilled in the art that with a two pole rotor, points on the stator core vibrate at a frequency which is twice that of the speed of rotation, this "forcing frequency" being 120 hertz (cycles per second) for a 3600 r.p.m. two pole rotor.

One method of isolating the outer supporting frame from the core vibration in the past has included the use of horizontal spring bars spaced at intervals around the inner bore of the frame. These are attached on their ends to the frame and attached at their centers to the vibrating core. The spring bar ends have been previously attached to full rings known as "bore rings." The bore rings were welded to radial section plates, which served to provide frame rigidity and passages for the gaseous coolant. Examples of the aforedescribed type of construction are seen in U.S. Pat. 2,199,141 to C. W. Rice, 2,199,350 to H. D. Taylor, and Re. Pat. 22,161 to L. P. Grobel. In order to prevent vibration of the outer frame at the forcing frequency, the frame was caused to have natural frequency higher than the vibrating core frequency. This was usually insured by the stiffness of the large bore rings supporting the spring bars. However, there was also required a certain minimum outer diameter for the frame due to requirements for cooling passages. Using this design approach, as the rating of the machines became larger and the core became larger, the frames had to also increase in outer diameter.

Because of its simple design and construction, the longitudinal spring bar mounting was used extensively in the construction of generators where stator frames and cores could be built integrally and shipped as single units. When generators became so large that they could no longer be shipped in one piece, the double-frame or cage-type construction was used wherein the stator core windings were contained in an inner frame or cage and shipped separately from the outer frame.

With the double frame construction, the cage was supported on vertical spring plates which were attached at the points of zero tangential motion in order to isolate vibratory forces of the cage (and core) and prevent their transmission to the outer frame. This construction is illustrated in U.S. Pat. 2,554,226 to H. D. Taylor. However, the cage-type construction is quite expensive, since two separate frames are required and it introduces complexity in the cooling system due to the necessity to seal the gas passages between frames.

Accordingly, one object of the present invention is to provide an improved integral frame construction of the horizontal spring bar type for a large generator.

Another object of the invention is to provide means to increase the stator core size of dynamoelectric machines without commensurate increase in outer diameter of the supporting frame.

Still another object of the invention is to disclose an improved type of design for integral or single piece dynamoelectric machine frames.

DRAWING

Figure 8:
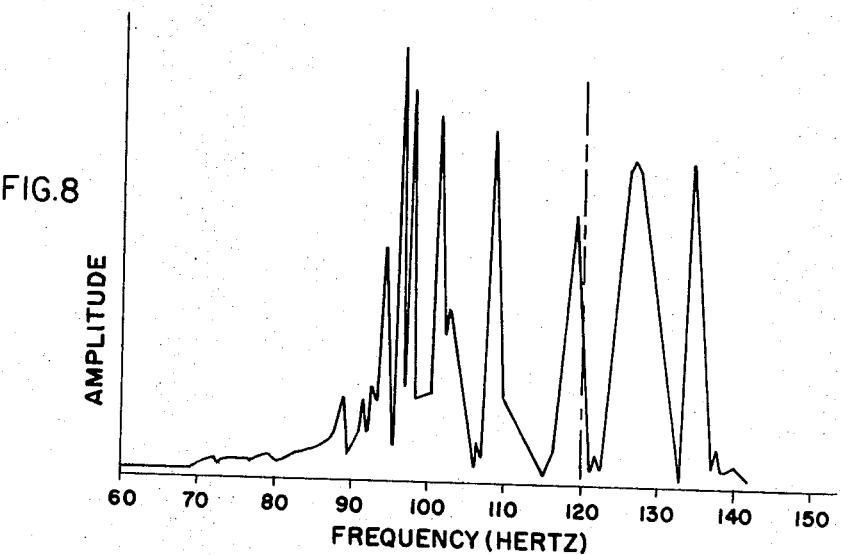
Figure 9:
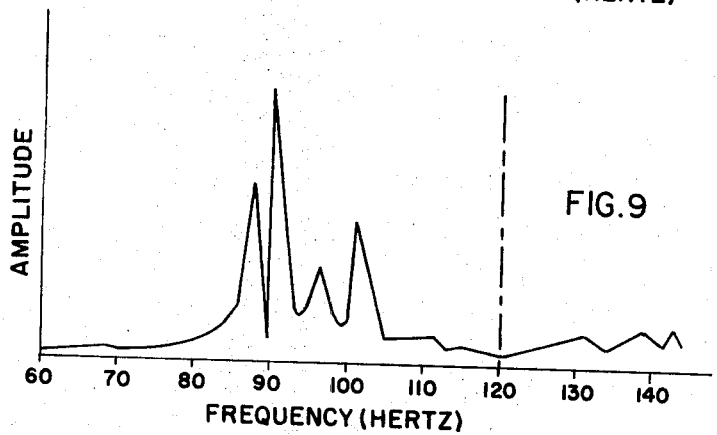

These and many other objects of the invention will become apparent by reference to the following description, taken in connection with the accompanying drawing, in which:

FIG. 1 is an end elevation view, partly in section,

FIG. 2 is a partial cross section through the top of the generator, taken along lines II—II of FIG. 1, FIG. 3 is a view looking radially outward along the lines III—III of FIG. 2, FIGS. 4 and 5 are enlarged detailed views of the spring bar mounting pads, looking from the end and side respectively, FIG. 6 is a graph illustrating effect of plate cutout area on its relative frequency, FIG. 7 is a diagrammatic view representing radial vibration of a typical section plate, and FIGS. 8 and 9 are graphs further illustrating the design method employed herein.

SUMMARY OF THE INVENTION

Briefly stated, the invention is practiced by supporting the stator core within the frame on horizontal spring bars which in turn are supported from circumferentially spaced pads on selected section plates mounted so as to keep the natural frequency of the plates low. The overall stator frame has a low fundamental natural frequency below the core vibrational forcing frequency. The stiffness and mass of the individual plates and sections are designed so that the parts are individually tuned to provide this low frequency.

DESCRIPTION

Referring to FIG. 1 of the drawing, the generator includes a wound electromagnetic stator core 2 supported at circumferentially spaced points by spring bar mountings 3 with in a stationary frame 4. The frame 4 is comprised primarily of an outer wrapper plate 5 and axially spaced section plates 6. The latter may be further distinguished as plates 6a which support the core and plates 6b which do not. Plates 6 include aligned holes 7 for cooling gas and, in accordance with the present invention, may also include extra notches or cutout portions 8 and 8a which will be explained in more detail later.

Referring to FIG. 2 of the drawing, the partial section eliminates a number of details which are not material to the present invention. However, for purpose of understanding, it will be known to those skilled in the art that horizontal pipes such as 9 may extend through the section plates 6 to carry cooling gas to the windings and core and to return hot gas to the cooler. Also the end shield assembly 30 may be one of various configurations not material to the present invention.

The magnetic core 2, which consists of thousands of thin laminations held by a dovetail connection on horizontal circumferentially spaced key bars 10, is flexibly supported by a number of horizontal spring bars 11. The spring bars 11 are pinned or bolted at their middles to key bars 10 as indicated at 12. At either end, the spring bars 11 are supported from the frame 4 by means of mounting pads 13.

FIG. 3 of the drawing, looking radially outward, shows that the key bar 10 extends along between pairs of spring bars 11. The core is therefore supported at a number of locations such as 12 which are flexibly mounted according to the keybar stiffness, here chosen to be very low. Thus, the key bar (and the core) are able to move radially with very little resistance, and therefore the mounting minimizes vibrational forces transnferred to the frame.

FIGS. 4 and 5 show enlarged views of the key bar, spring bar and pad arrangement. The ends of the spring bars 11 may be attached as by bolts 14 or alternatively may be welded in place. Each pad 13 is welded between two section plates 6a in notches provided for this purpose.

FIG. 4 shows a typical method of supporting the core laminations from the key bar 10, using a dovetail connection 15.

In accordance with the present invention, it is of particular importnace to note the fact that the support points for the ends of the spring bars 11 are not attached to continuous "bore rings" around the central holes in section plates 6 as in the prior art. Rather, they are attached to a number of separate and discrete circumferentially spaced pads 13. These preferably extend axially between two section plates as shown most clearly in FIG. 3. However, the pads might also be circumferentially spaced around and supported on a single section plate.

The end shield assembly 30 has an inherently high natural frequency because of its great radial depth. Therefore, in order to isolate the effect of the high frequency end shield 30 from the frame, a relatively thin flexible wrapper section 16 with a connected radial plate 17 is employed to connect the end shield to the frame proper at a location offset from the end of the frame.

In accordance with the invention, the individual section plates 6 are all tuned by known design methods to a common low frequency, taking into account the stiffening effects of the connected members such as spring bars 11. As is well known, the formula for determining the natural frequency in hertz of a simple undamped member is:

$$f_n = \frac{1}{2\pi}\sqrt{\frac{k}{m}}$$

where $k$ is the effective spring constant or stiffness in the particular deflection mode under consideration and $m$ is the mass. Thus the nautral frequency of a single section plate may be reduced either by reducing the stiffness, or by increasing the mass.

Referring to FIG. 7 of the drawing, there is illustrated the type of radial vibration which is of primary concern with respect to the electromagnetic core forcing frequency. As shown in FIG. 7, a typical flat circular section plate 20 with a central bore will deflect into an elliptical shape which rotates in synchronism with a two pole rotor. An equivalent motion may be determined by design analysis using a static plate vibrating in a radial four-nodal mode.

For a given outer diameter, the frequency will be decreased by:

(1) Reducing the moment of inertia (and thereby the stiffness) in the radial plane by providing cutouts or notches in the plate, especially at the inner and outer diameters.

(2) Increasing the inner diameter of the bore opening.

(3) Adding mass circumferentially at discrete locations without changing the plate stiffness.

(4) Redistributing the existing mass of the plate (radially) to reduce the moment of inertia of the plate cross section.

The effect on the plate nautral frequency of the foregoing steps can be calculated and predicted accurately by well known design methods.

As an example of item 3, the foregoing, FIG. 7 illustrates discrete pads 13 circumferentially spaced around the inner diameter of the plate 20. It will be observed that the spring stiffness of plate 20 which resists this type of bending pattern shown in FIG. 7 is not appreciably increased by the addition of pads 13, since they are discrete masses, and do not increase the moment of inertia of the plate between pads. The additional mass acts to reduce the natural frequency, in accordance with the foregoing formula.

By contrast, the addition of a continuous ring having the same mass as pads 13 at the inner diameter of plate 20 would not serve to reduce the frequency of the ring, but rather would increase the frequency because of the added stiffness and uniformly increased moment of inertia of the ring causing it to resist the elliptical deflection pattern shown.

Another design principle illustrative of item 1 above and utilized herein is through the use of extra cutouts or notches in the plates, especially at the inner and outer diameters. These are shown as cutouts 8 in FIG. 1 around the outer diameter and as cutouts 8a at the inner diameter near where the pads 13 are disposed. Another method is to use much larger cooling holes 7 in the center of the plate than are actually necessary for carrying the cooling gas.

FIG. 6 is a graph showing how relative frequency of a plate decreases as additional percentage of plate area is removed, it being assumed that the cutout area is distributed uniformly around the plate.

In accordance with the present invention, all of the individual section plates are tuned to a single selected common frequency below the forcing frequency of the vibrating stator core, here assumed to be 120 hertz. By tuned, it is not meant herein that the parts are physically tuned, although such a procedure may be used to supplement or supplant a designed theoretical or empirical predetermination of frequency.

When these individual sections are assembled, the overall frame will also have a natural frequency very near to that of the pre-tuned individual sections. Contrary to the practice of the prior art, the frame frequency is designed to lie below the forcing frequency, preferably around 75% thereof or in a range between 60% and 85% thereof. For a 3600 r.p.m. two pole machine a suitable range might be between 75 and 105 hertz. For a 3000 r.p.m. two pole machine, a suitable range is between 60 and 90 hertz.

FIG. 8 of the graph shows a frame designed without regard to the natural frequencies of the individual sections. It will be seen that the peak amplitudes of the vibrations, measured on the vertical scale, fall at various frequencies above and below the 120 hertz forcing frequency. This is caused by resonance of individual frame pieces acting on the frame when a forcing frequency is caused to coincide with each individual natural frequency.

FIG. 9, on the other hand, shows a design according to the present invention, wherein the individual section plates and other parts have been individually pretuned by mathematical calculation or empirical determination to the same low frequency. It will be seen that the combined effect is to cause the overall frame amplitude to peak near 90 hertz and in addition there are no resonant frequencies in the vicinity of 120 hertz. Naturally, the complexity and interactions between some sections cause some deviations from an idealized design curve.

The benefit of the foregoing design is to enable larger stator cores in a frame of a given outside diameter than has heretofore been possible with a single frame construction. For example, in the past, the ratio between the outer frame diameter to the core outer diameter of prior art high frequency frames has been limited to a minimum of 1.4. Under the present invention, by designing the frame to a low frequency below the forcing frequency, it is possible to reduce the foregoing ratio to 1.2 and less. This means that for a given outside diameter of the frame, the outside diameter of the core can be increased.

Although the description has been exemplified by references to a 120 hertz forcing frequency, because this is most common, it will be understood that for 50 cycle generators, the concept involves design below the 100 hertz forcing frequency for two pole machines.

While there is shown what is considered at present to be the preferred embodiment of the invention, it is of course understood that various other modifications may be made therein, and it is intended to cover in the appended claims all such modifications as fall within the true spirit and scope of the invention.

What we claim as new and desire to secure by Letters Patent of the United States is:

1. In a dynamoelectric machine of the type having a cylindrical frame flexibly supporting a cylindrical magnetic core on a plurality of horizontal spring bars attached for isolating the frame from core vibration at a forcing frequency caused by operation at a normal speed, the improvement characterized by:
   first axially spaced section plates defining central bore openings for said core and substantially unattached to said core or said spring bars,
   second axially spaced section plates interspersed among said first plates, said second plates defining central bore openings for said core and having the ends of said spring bars attached thereto via individual mounting pads at circumferentially spaced discrete locations,
   a frame wrapper enclosing said first and second section plates, said first and second section plates all being tuned to a common natural frequency which is substantially lower than said forcing frequency, whereby the overall frame frequency is also below said forcing frequency.

2. The combination according to claim 1, wherein said second section plates are adjacent in pairs and include said circumferentially spaced individual mounting pads disposed therebetween, said pads having the ends of the spring bars attached thereto.

3. The combination according to claim 1, wherein said second section plates define cutout openings around the edges at the inner and/or outer diameters arranged to compensate for increased effective stiffness caused by the spring bar mountings.

4. The combination according to claim 1, wherein a radial end shield assembly is attached to said frame wrapper by an additional wrapper which is substantially thinner and more flexible than the frame wrapper.

5. The combination according to claim 4, wherein said additional wrapper is of a greater outside diameter than the frame wrapper and is attached thereto at a location displaced from the end thereof by a radial connecting member.

6. The combination according to claim 1, wherein the frequencies of said first and second section plates are tuned to a common frequency lying in a range between 60% and 85% of said forcing frequency.

7. The combination according to claim 1, wherein said first and second section plates are tuned to a common frequency between 75 and 105 hertz.

8. The combination according to claim 1, wherein the ratio of outer diameter of said section plates to outer diameter of said core is less than 1.2.

References Cited

UNITED STATES PATENTS

| | | | |
|---|---|---|---|
| Re. 22,161 | 8/1942 | Grobel | 310—258 |
| 2,199,141 | 4/1940 | Rice | 310—258 |
| 2,199,351 | 4/1940 | Taylor | 310—258 |
| 3,395,296 | 7/1968 | Cohen | 310—51 |

FOREIGN PATENTS 1,189,189   3/1965   Germany.

DONOVAN F. DUGGAN, Primary Examiner

U.S. Cl. X.R.

310—258